US005207555A

United States Patent [19]

Shirai

[11] Patent Number: 5,207,555

[45] Date of Patent: May 4, 1993

[54] RUNNING FORK TYPE LOAD TRANSFER APPARATUS

[75] Inventor: Yoji Shirai, Suita, Japan

[73] Assignee: Daifuku Co., Ltd., Osaka, Japan

[21] Appl. No.: 791,972

[22] Filed: Nov. 13, 1991

[30] Foreign Application Priority Data

May 13, 1991 [JP] Japan ........................ 3-138242

[51] Int. Cl.[5] ........................ B65G 1/00

[52] U.S. Cl. ........................ 414/749; 187/9 R; 414/663; 414/282; 414/664

[58] Field of Search ............... 414/286, 282, 281, 277, 414/280, 718, 659, 660, 661, 662, 665, 664, 668, 749, 750, 751, 752, 753; 187/9 R, 9 E

[56] References Cited

U.S. PATENT DOCUMENTS

| | | | |
|---|---|---|---|
| 2,904,197 | 9/1959 | Asheim et al. | 414/663 |
| 3,318,469 | 5/1967 | Bigler | 414/663 |
| 3,561,620 | 2/1971 | Willis | 414/282 |
| 3,596,789 | 8/1971 | Aaronson | 414/662 |
| 3,934,741 | 1/1976 | Wentz | 414/663 |
| 4,936,730 | 6/1990 | Morioka | 414/282 X |
| 5,015,140 | 5/1991 | Kling | 414/663 X |

FOREIGN PATENT DOCUMENTS

| | | | |
|---|---|---|---|
| 1527570 | 4/1968 | France | 414/664 |

*Primary Examiner*—Frank E. Werner
*Attorney, Agent, or Firm*—Schweitzer Cornman & Gross

[57] ABSTRACT

The secondary fork 36 is composed of an aluminum extrusion which is formed integrally with a pair of right and left outward guide rail grooves 40*a*, 40*b* to be fitted with the guide rollers 45, 46 provided on the fixed fork 35 side and a pair of right and left inward guide rail grooves 41*a*, 41*b* to be fitted with the guide rollers 47, 48 provided on the primary fork 37 side, so as to form the secondary fork 36 in a single member. As a result, assembling operation is not needed, and therefore the number of parts and the assembling processes of the running fork type load transfer apparatus can be greatly curtailed, so as to reduce the cost.

3 Claims, 6 Drawing Sheets

RUNNING FORK TYPE LOAD TRANSFER APPARATUS

FIELD OF THE INVENTION

The present invention relates to a running fork type telescoping load transfer device suitably for use in traveling cranes or the like such as in an automated warehouse.

BACKGROUND OF THE INVENTION

Running forks of the type dealt with herein, usually have a fixed fork, a secondary fork telescoping in or out of the fixed fork, and a primary fork telescoping in or out of the secondary fork.

Conventionally in such running fork, both the secondary fork and primary fork are comprised of right and left rails and a plate for linking them. Too many parts are involved in this prior art structure, they are heavy and complicated, and their assembly requires a large number of operations.

DESCRIPTION OF THE INVENTION

The present invention concerns a running fork type load transfer device, in which the secondary fork is an aluminum extrusion having integral right and left outward guide rail grooves. Guide rollers of the fixed fork are adapted to run in these grooves, and right and left inward guide rail grooves and the guide rollers of the primary fork are adapted to run within these internal grooves.

In this structure of the invention, since the secondary fork is of an aluminum extrusion formed with integral guide rail grooves in which guide rollers of the fixed fork and of the primary fork can fit, no assembly of the secondary fork is required, and the number of parts of the entire transfer device and their assembly are greatly reduced, so that its cost is similarly reduced.

According to the present invention, the primary fork includes a central member of an aluminum extrusion for supporting the guide rollers on its right and left sides, and a load platform mounted on the central member. Thus the structure is further simplified and the number of parts of the entire transfer device and their assembly are further reduced.

The durability of the apparatus can be enhanced by coating the interiors of the guide rail grooves of the secondary fork with an anodized hard, noncorroding oxide film.

DESCRIPTION OF THE DRAWING

The invention is described in greater detail by way of a suitable embodiment, with reference being had to the drawing, wherein.

DETAILED DESCRIPTION

Figure 1:
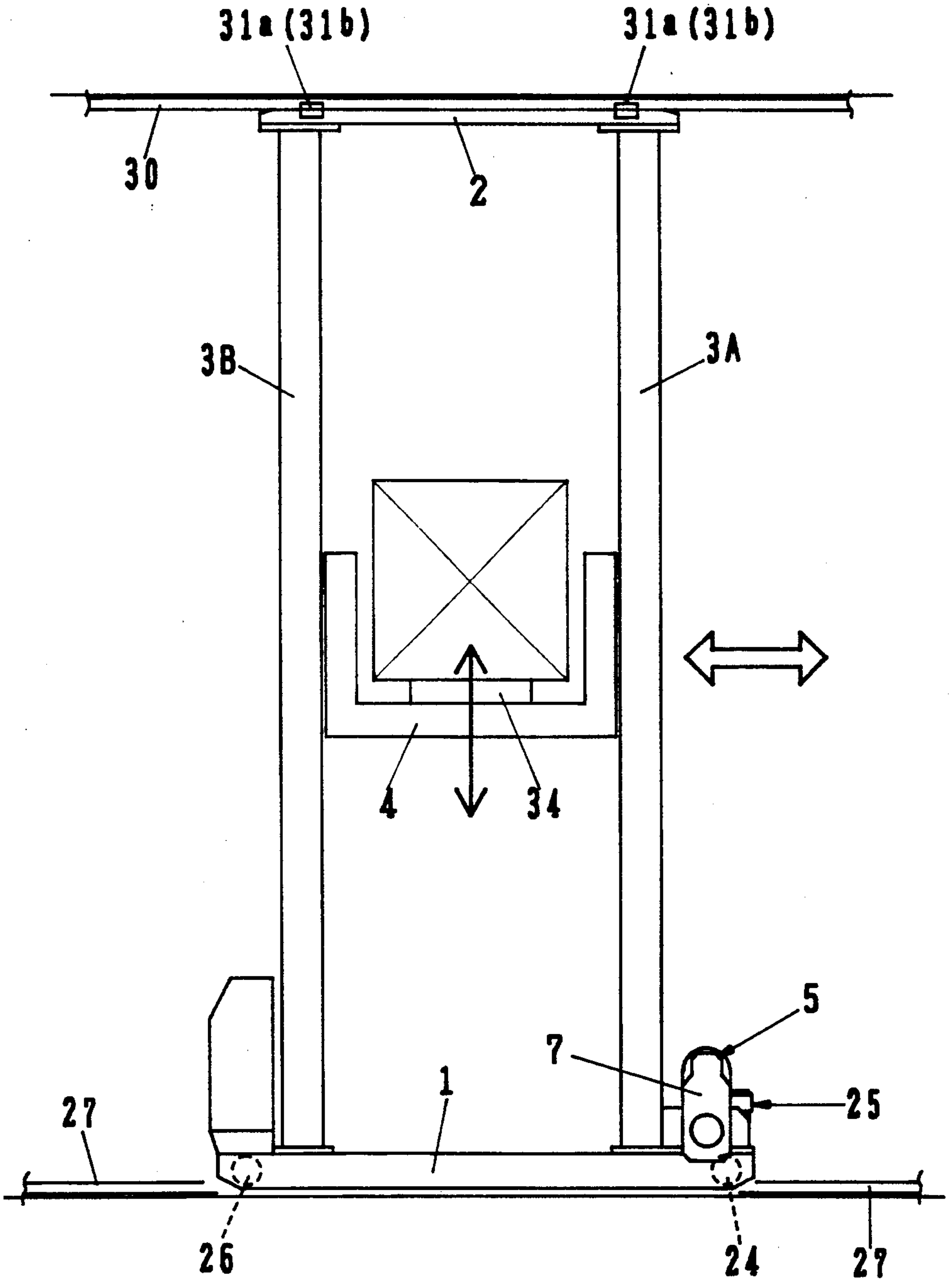
FIG. 1 is a end view of a traveling crane utilizing the load transfer device of the invention.
Figure 2:
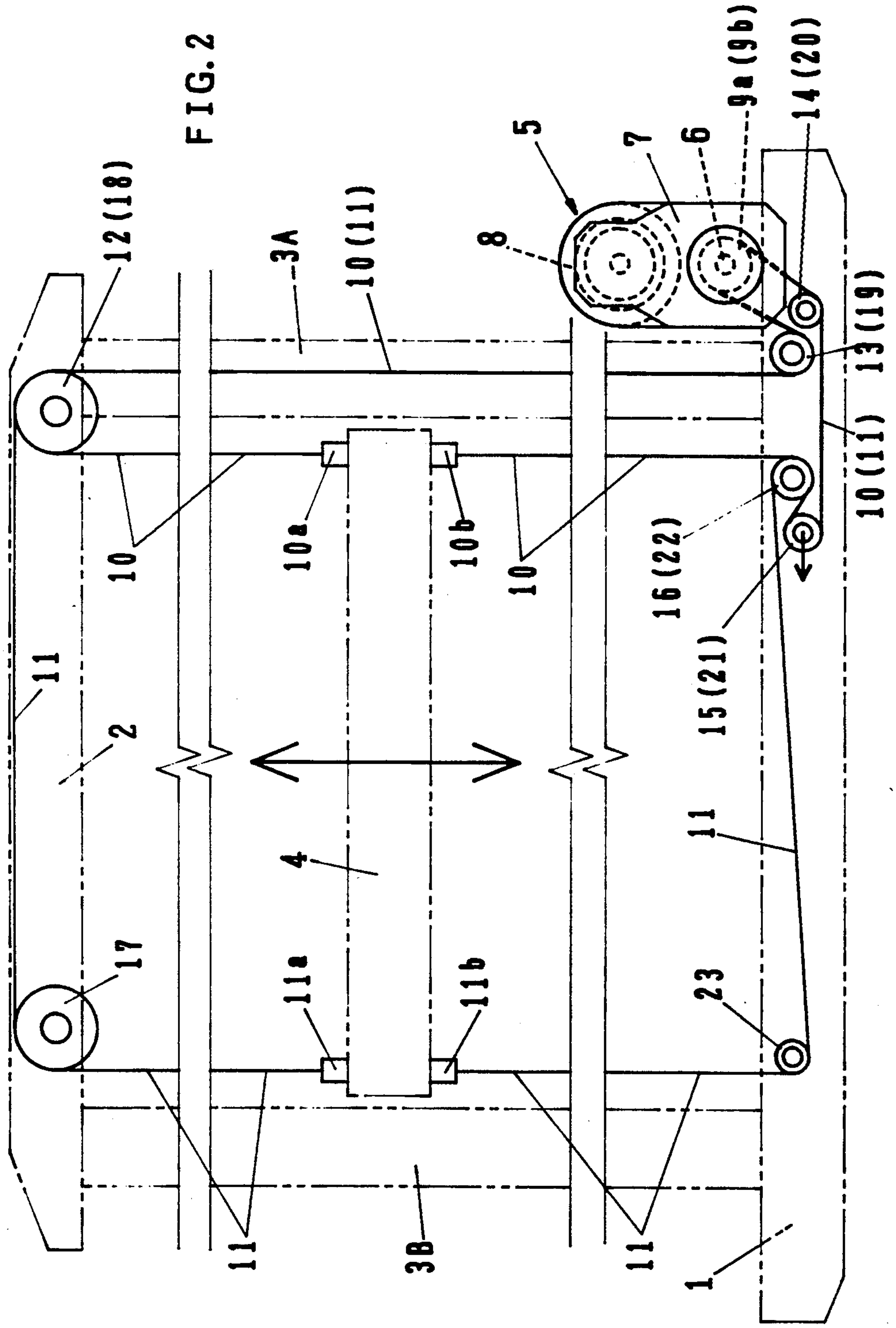
FIG. 2 is a schematic side view of the crane, particularly showing the means for elevating and driving the elevating platform.

An example of a traveling crane using the load transfer device of the present invention, is described in my copending application Ser. No. 791,975 filed on even date herewith, now U.S. Pat. No. 5,188,199.

In FIGS. 1–4 a lower frame 1, an upper frame 2, are connected to each other by front and rear guide posts 3A and 3B. An elevating platform 4 ascends and descends between the guide posts 3A, 3B. A drive 5 of the elevating platform 4 has a drive shaft 6 supported horizontally on the top surface of one end of the lower frame 1, and a motor 8 is provided for driving the shaft 6 forward and backward through a reduction gear 7. The drive 5 has two drive chains 10, 11 for elevating and driving the platform 4 through engagement with two pinion gears 9a, 9b mounted on the drive shaft 6.

One drive chain 10 has one of its ends 10a attached to the top of the elevating platform 4 adjacent to the guide post 3A. The chain rotates freely over an idler 12 which is mounted from the upper frame 2. From here the chain 10 passes to the lower frame 1 through the interior of the guide post 3A, and then rotates freely over an idler 13 which is mounted from the lower frame 1. Then the chain 10 passes over the pinion gear 9a and an idler 14 in the lower frame 1, then through tensioning idlers 15 and 16 the chain passes upwardly from inside the lower frame 1, and its other end 10b is attached to the underside of the elevating platform 4 adjacent to the guide post 3A.

The other drive chain 11 has one end 11a attached to the top of the elevating carriage 4 at a position adjacent to the guide post 3B. The chain 11 then passes over an idler 17 mounted from the upper frame 2. Then the chain 11 passes in succession through an idler 18 that coaxial with the idler 12, through the interior of the upper frame 2, and is led into the lower frame 1 though the interior of the guide post 3A, and then about the pinion gear 9b, idler 19 that is coaxial with the idler 13. Then the chain 11 passes through an idler 20 that is coaxial with the idler 14 in the lower frame 1, then through tensioning idlers 21 and 22 that are respectively coaxial with tensioning idlers 15 and 16, then passed the idler 23, from where it is led upward and its other end 11b is attached to the underside of the elevating platform 4 adjacent to the guide post 3B.

Therefore, when the drive pinions 9a, 9b in the drive 5 are driven forward (clockwise in FIG. 2) by the motor 8, the chains 10, 11 suspending the elevating platform 4 raise the elevating carriage 4 along the guide posts 3A, 3B. The portions of the both chains 10, 11 passing from the pinion gears 9a, 9b are pulled by the elevating platform 4 which moves upward. When the pinion gears 9a, 9b are driven in reverse (counterclockwise) the elevating platform 4 is lowered.

Figure 3:
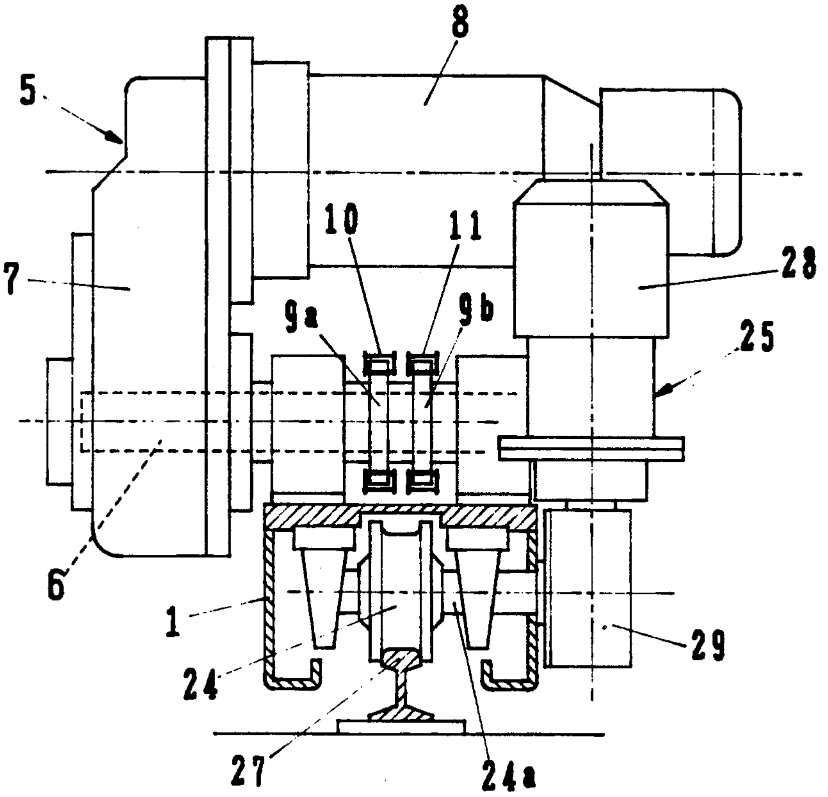
FIG. 3 is a partial longitudinal cross-sectional front view showing essential parts of the elevating and driving means and the traveling drive of the crane.

As shown in FIGS. 1 and 3, a traveling drive is disposed in the lower frame 1. The traveling drive 25 has a grooved drive wheel 24 attached by a driven shaft 24a to one end of the lower frame 1 and a groove free roller 26 is attached to its other end. A supporting guide rail 27 rests on the floor and the wheels 24, 26 are adapted to run over that rail. As shown in FIG. 3, the traveling drive 25 comprises a vertically disposed motor 28 and an orthogonal transmission 29 for transmitting the rotation of the motor 28 to the drive shaft 24a of the driven wheel 24.

Figure 4:
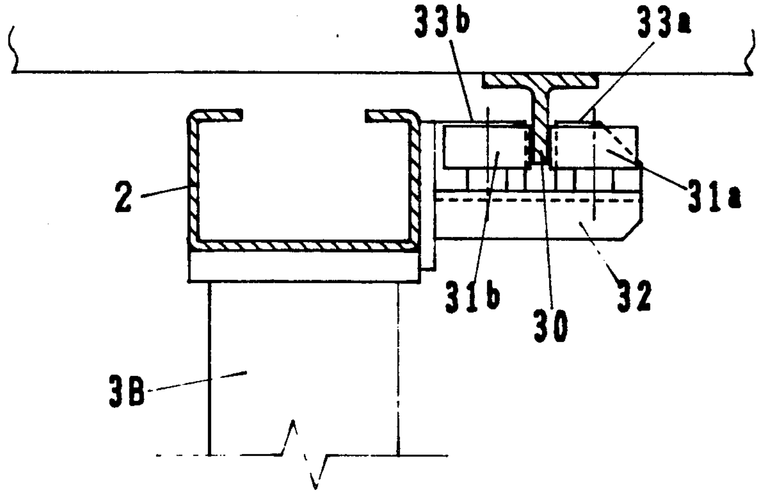
FIG. 4 is a partial longitudinal cross-sectional rear view showing a guide rail for prevention of vibration in the upper frame of the crane.

As shown in FIG. 4, in the sides near the front and the rear ends of the upper frame 2, front and back pairs of right and left top guide post rollers 31a, 31b are mounted from a bracket 32 and disposed respectively on the right and left sides of the anti-vibration guide rail 30 that is attached to the ceiling. Each bracket 32 is provided with retaining plates 33a, 33b that are respectively disposed on both sides of the rail 30 for preventing the crane from toppling if the rollers 31a, 31b drop out from their position on the right and left sides of the anti-vibration guide rail 30.

When the motor 28 of the traveling drive 25 rotates the driven wheel 24, the crane will travel forward or backward along the guide rails 27, 30 which support it.

A load transfer device 34 of the invention is mounted on the elevating platform. The load transfer device 34 is explained by reference to FIGS. 5 to 7. As shown in FIG. 7, a fixed fork 35 is composed of a bottom member 38, and right and left sidewall members 39a, 39b. The bottom member 38 rests on and is attached to the elevating platform 4.

A secondary fork 36 is an aluminum extrusion integrally including right and left outward facing guide rail grooves 40a, 40b, and right and left inward facing guide rail grooves 41a, 41b positioned inwardly of guide rail grooves 40a, 40b. A primary fork 37 is comprised of a central member 43 of an aluminum extrusion and sidewall parts 42a, 42b on both right and left sides formed integrally therewith, and a load transfer platform 44 mounted on the central member 43.

supporting horizontal shaft guide rollers 45 (one side omitted) and anti-vibration vertical shaft guide rollers 46 (one side omitted) are disposed within the sidewalls 39a and 39b. These rollers 45 and 46 run in the outward guide rail grooves 40a, 40b of the secondary fork 36. supporting horiztonal shaft guide rollers 47 (one side omitted) and anti-vibration vertical shaft guide rollers 48 (one side omitted) are mounted from the exterior of sidewalls 42a and 42b of the primary fork central member 43. These rollers 47 and 48 are adapted to run in the inward facing guide rail grooves 41a, 41b of the secondary fork 36.

Guide blocks can also be used instead of the anti-vibration vertical shaft guide rollers 46, 48. It is also possible, by reducing the diameter of the supporting horizontal shaft guide roller 45 for the purpose of preventing the secondary fork 36 from getting loose, to journal the supporting horizontal shaft guide roller for supporting the secondary fork 36 at the lower side of the roller 45, inside of both wall members 39a, 39b in the fixed fork 35.

Figure 5:
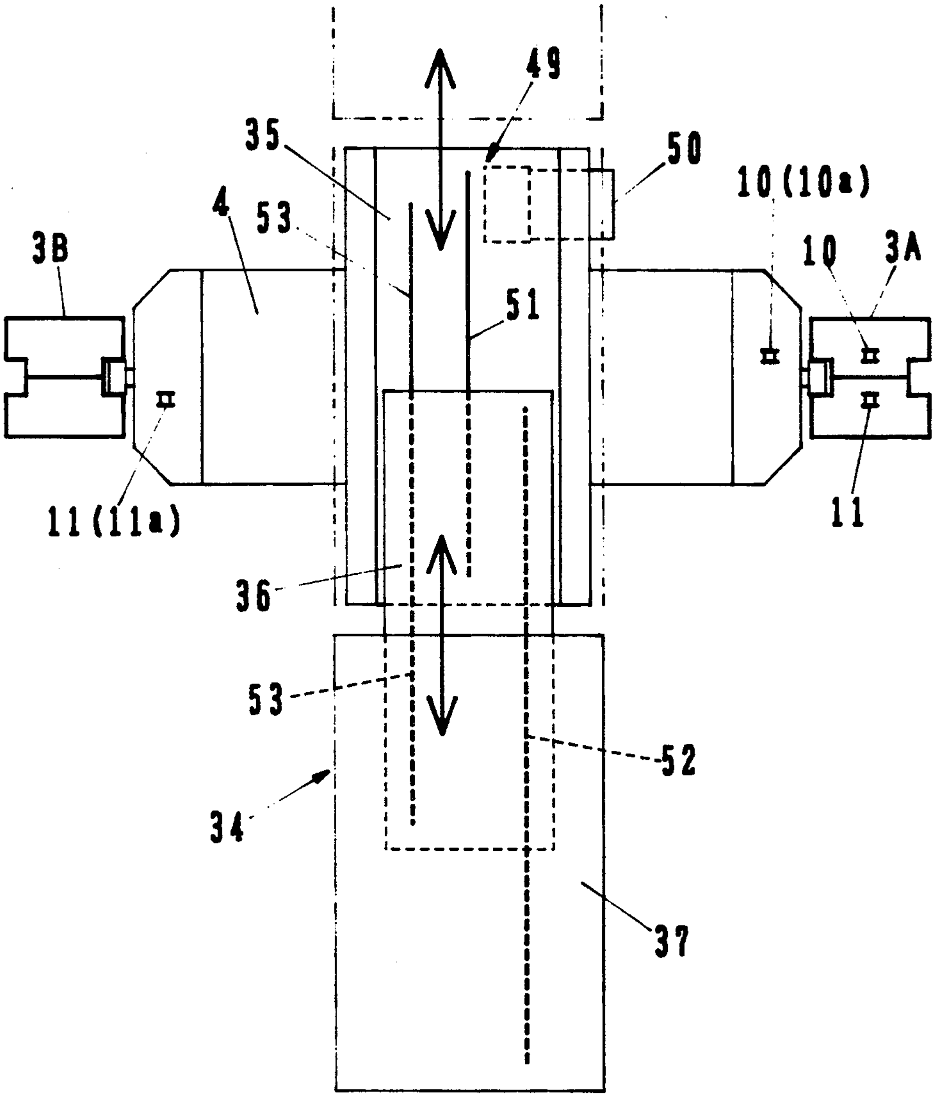
FIG. 5 is a cross sectional plan view showing the load transfer device on the elevating platform of the crane.
Figure 6:
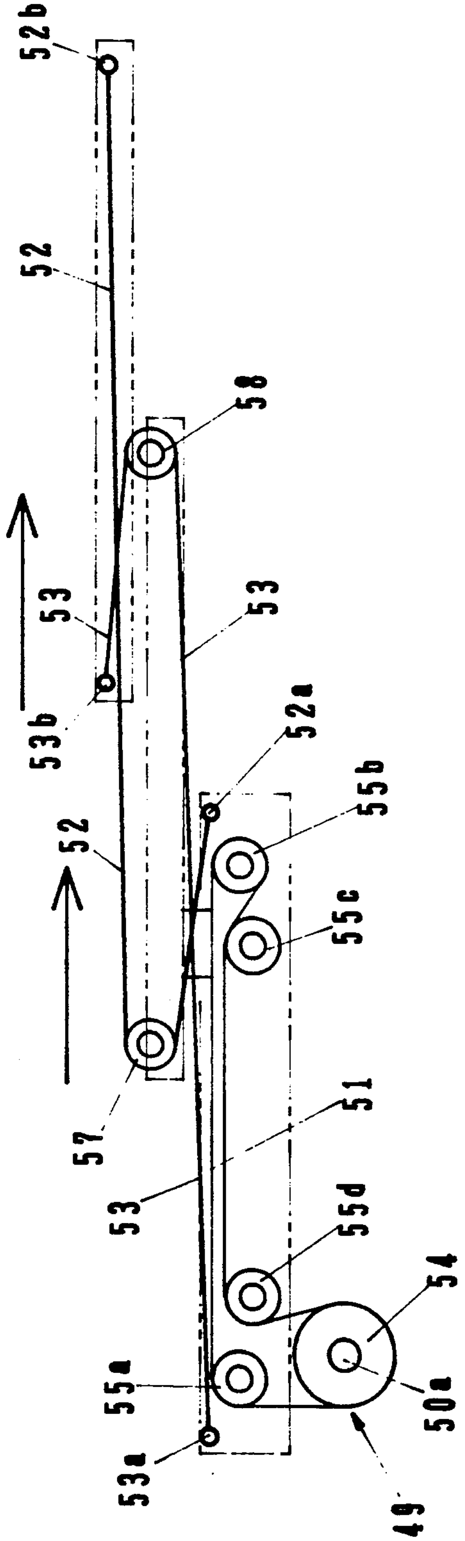
FIG. 6 is a schematic side view showing a drive for reciprocating the load transfer device.
Figure 7:
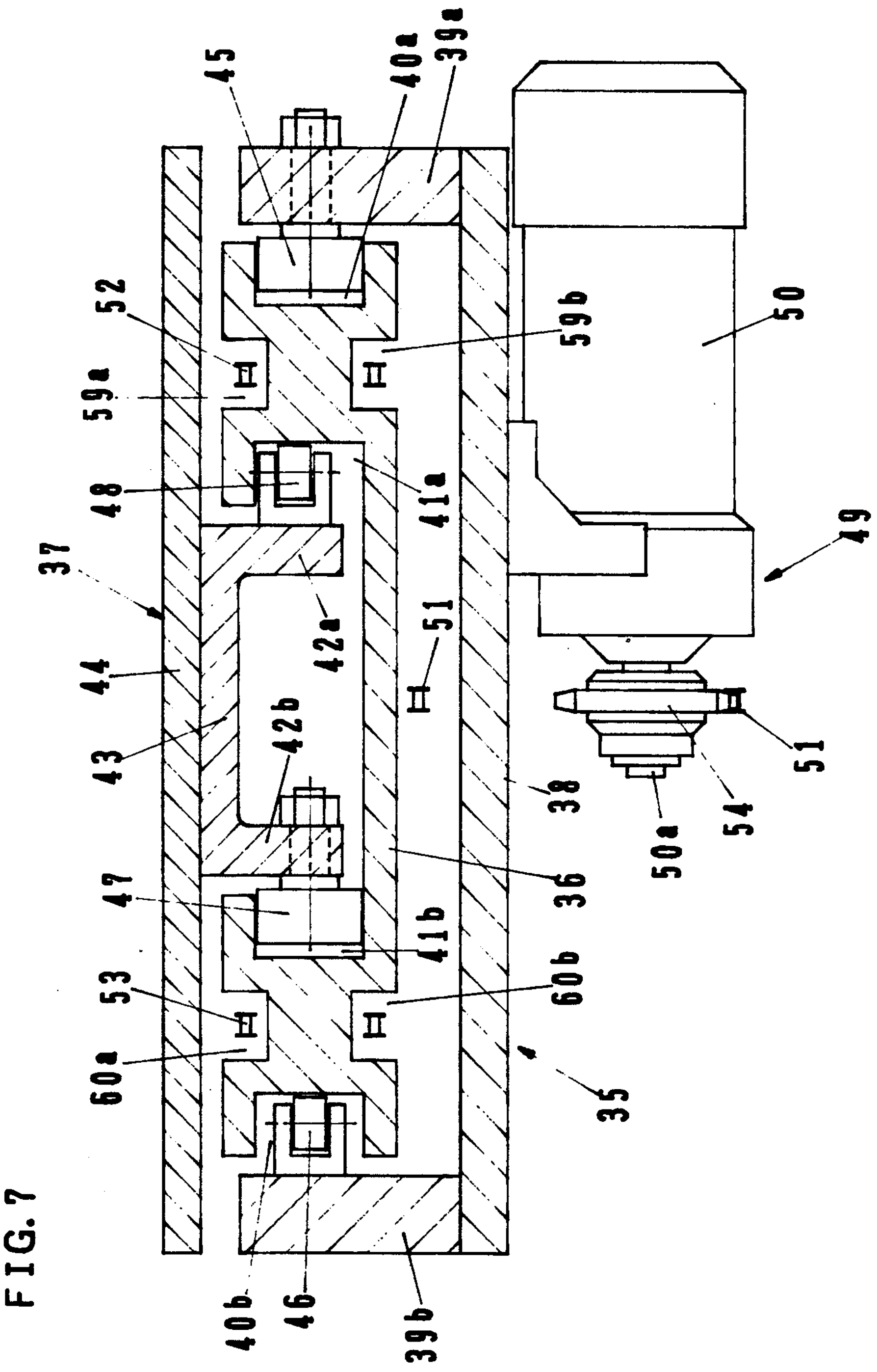
FIG. 7 is a longitudinal cross-sectional front view showing essential parts of the load transfer device.

A drive 49 for telescoping in and out of the load transfer device 34 is shown in FIGS. 5 to 7. This drive 49 comprises a motor 50 with reduction gear mounted sideways at the lower surface of one end of the fixed fork 35, a driving chain 51 which is driven and rotated forward normally or in reverse by the motor 50 for telescoping the secondary fork in an out and a pair of chains 52, 53 for telescoping the primary fork 37 in or out, relative to the secondary fork 36.

The driving chain 51 for the secondary fork is applied between the ends of the fixed fork 35 with respect to the moving direction of the secondary fork 36, by means of a driving pinion gear 54 mounted from the drive shaft 50a of the motor 50. A plurality of idlers 55a to 55d attached to the fixed fork 35 change the direction of the path of the driving chain 51. The driving chain is coupled with the bottom of the secondary fork 36 by a linkage member 56 (see FIG. 6). Therefore, by rotating the chain 51 forward or in reverse by the motor 50, the secondary fork 36 can be telescoped in or out to either the front and rear end side of the fixed fork 35.

Of course, instead of the chain type driving means as mentioned above, it is also possible to drive the telescoping in and out the secondary fork 36 by a rack and pinion. In that case a rack is attached to the bottom of the secondary fork 36 and a pinion gear to be rotated either forward or in reverse by the motor, is engaged with the rack at the side of the fixed fork 35. In this case, the protruding rack gear can be formed by extruding it together with the secondary fork 36.

The ends 52a, 52b of the chain 52 are attached respectively to the right end of the fixed fork 35 and to the right end of the primary fork 37. The middle part of the chain 52 is applied over an idler 57 mounted from the left end of the secondary fork 36. The ends 53a, 53b of the chain 53 are attached respectively to the side at the left and of the fixed fork 35 and to the side at the left end of the primary fork 37. The middle part of the chain 53 is applied over an idler 58 mounted from the right end of the secondary fork 36.

Accordingly, when the drive 49 moves the secondary fork 36 to the right of the fixed fork 35, for example, as shown in FIG. 6 by operating the motor 50, the idler 58 at the right side of the secondary fork 36 pulls the end part 53b of the chain 53, which is toward the primary fork, so that the primary fork 37 is also moved to the right of the secondary fork 36.

Thus the primary fork 37 advances in the same direction as the secondary fork 36 by twice the distance of the motion of the secondary fork 36 from the fixed fork 35. By rotating the motor 50 in reverse, when the secondary fork 36 moves to the left, the idler 57 at the now forward moving direction and of the secondary fork 36, pulls the end part at 52b of the primary fork 37 of the chain 52, so that the primary fork 37 also moves to the left of the secondary fork 36.

As shown in FIG. 7, right upper and lower cavities 59a, 59b, and left upper and lower cavities 60a, 60b. The drive chains 52, 53 pass through the right and left upper with the cavities, respectively, of the secondary fork 36. This contributes to reducing the thickness of the transfer device. Moreover, the durability of the secondary fork can be enhanced by coating the interior roller rolling surfaces, of the guide grooves 40a, 40b, 41a and 41b in the secondary fork 36, with a hard anodized, noncorroding oxide film.

What is claimed is:

1. A running fork type load transfer device comprising a fixed fork, a secondary fork, and a primary fork, each of said forks having a front end and a rear end, said secondary fork having an idler each at its front and rear ends, said forks being disposed horizontally movably one above another, means for moving said secondary fork and said primary fork, said secondary fork being adapted to telescope in and out of the fixed fork and said primary fork being adapted to telescope in and out of said secondary fork, first and second motion transmitting flexible means for telescoping said primary fork in and out relative to said secondary fork, each of said first and said second flexible means connecting said forks to each other with the respective ends of said flexible means being connected from a respective given end of said fixed fork and of said primary fork which is a same respective given end, a part of each of said flexible means intermediate its ends passing around a respective idler on said secondary fork which respective idler is disposed in each case at an opposite end to said given end, wherein said secondary fork is an aluminum extrusion having therein integral right and left portions each including an outward guide groove, right and left inward guide groove, and upper and lower cavities, a first pair of guide rollers attached to said to fixed fork and arranged to roll within said outward guide grooves, and a second pair of guide rollers attached to said primary fork and arranged to roll within said inward guide grooves, said motion transmitting flexible means being disposed for passing within said upper and lower cavities.

2. The running fork type load transfer device of claim 1, wherein the primary fork includes a central member of extruded aluminum, said central members having left and right sidewalls, said second pair of guide rollers being rotatably mounted from each of said sidewalls and a load transfer platform mounted from said central member.

3. The running fork type load transfer device of claim 1, wherein interior surfaces of said inward and outward grooves of the secondary fork are covered with a hard, anodized, noncorroding oxide film.

* * * * *